United States Patent
Soled et al.

(10) Patent No.: US 6,900,151 B2
(45) Date of Patent: May 31, 2005

(54) IN SITU CATALYST REGENERATION/ACTIVATION PROCESS

(75) Inventors: Stuart Leon Soled, Pittstown, NJ (US); Joseph Ernest Baumgartner, Califon, NJ (US); Gabor Kiss, Hampton, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 456 days.

(21) Appl. No.: 10/054,228

(22) Filed: Nov. 13, 2001

(65) Prior Publication Data

US 2003/0092781 A1 May 15, 2003

(51) Int. Cl.[7] ............................ B01J 38/10; B01J 38/12; C07C 27/00; C07C 27/06
(52) U.S. Cl. ............................ 502/53; 502/38; 518/700; 518/701; 518/709; 518/715; 518/721
(58) Field of Search ..................... 502/53, 38; 518/700, 518/701, 709, 715, 721

(56) References Cited

U.S. PATENT DOCUMENTS

| | | | |
|---|---|---|---|
| 2,472,501 A | 6/1949 | Sweetser | 260/449.6 |
| 2,530,998 A | 11/1950 | Scharmann | 260/449.6 |
| 5,260,239 A | * 11/1993 | Hsia | 502/30 |
| 5,268,344 A | * 12/1993 | Pedrick et al. | 502/30 |
| 5,817,702 A | 10/1998 | Behrmann et al. | 518/700 |
| 5,844,005 A | * 12/1998 | Bauman et al. | 518/700 |
| 5,958,986 A | 9/1999 | Mart et al. | 518/709 |

FOREIGN PATENT DOCUMENTS

| | | | |
|---|---|---|---|
| EP | 0363537 | 4/1990 | C07C/1/04 |
| WO | WO 01/36352 | 5/2001 | C07C/1/04 |

* cited by examiner

Primary Examiner—Stanley S. Silverman
Assistant Examiner—Jonas N. Strickland
(74) Attorney, Agent, or Firm—Norby L. Foss; Joseph J. Dvorak (57) ABSTRACT

An in situ process for conducting regeneration of spent hydrocarbon synthesis catalyst. Regenerated, but not yet re-activated, catalyst (15) may be introduced into an operating HCS reactor (1) that has catalyst rejuvenation means (14). Any combination of a fresh, activated catalyst, a fresh, passivated catalyst or short-term or long-term deactivated catalysts may already be present in the HCS reactor (1). The regenerated, but not yet re-activated catalyst is activated in the HCS reactor (1) with rejuvenation means (14) at normal process conditions. The HCS reactor (1) receives syngas through the inlet line (3) and releases liquid hydrocarbons through outlet line (4) and gaseous hydrocarbon and unreacted syngas through the offgas line (2). Catalyst is removed from the HCS reactor (1) through the slipstream line (5) and into a filtration unit (6) which is fed with a stripping fluid (7). The filtered catalyst proceeds to the regeneration unit (9) which is fed a regenerative fluid (10). The regenerated catalyst is returned to the HCS Reactor (1) through the catalyst return line (11) where it is reactivated.

16 Claims, 4 Drawing Sheets

Slipstream of slurry and catalyst

IN SITU CATALYST REGENERATION/ACTIVATION PROCESS

FIELD OF THE INVENTION

The present invention relates to an in situ method of regenerating catalysts used in Hydrocarbon Synthesis Catalytic (HCS) processes. Specifically, the present invention provides a means and process for in situ catalyst regeneration in which no "on-site" catalyst activation vessel is required and in which the catalyst can be activated in a Fischer-Tropsch reactor. More specifically, the present invention provides a means and process for supported bi-metallic cobalt catalyst regeneration without interrupting the hydrocarbon synthesis continuous slurry process flow scheme and without the need for any additional catalyst activation vessels.

BACKGROUND OF THE INVENTION

The preparation of hydrocarbons from a mixture of hydrogen and carbon monoxide at elevated temperature and pressure in the presence of a catalyst is referred to in the literature as the Fischer-Tropsch hydrocarbon synthesis (HCS). Depending on the catalyst and conditions, the hydrocarbons may range from oxygenated compounds such as methanol and higher molecular weight alcohols, to high molecular weight paraffins which are waxy solids at room temperature. The process also makes, generally in lesser amounts, alkenes, organic acids, ketones, aldehydes and esters. The synthesis is conducted in a fixed or fluidized catalyst bed reactor or in a three phase slurry reactor.

Hydrocarbon synthesis catalysts are well known and a typical Fischer-Tropsch hydrocarbon synthesis catalyst will comprise, for example, catalytically effective amounts of one or more Group VIII metal catalytic components such as Fe, Ni, Co, Rh, and Ru. Preferably the catalyst comprises a supported catalyst, wherein the one or more support components of the catalyst will comprise an inorganic refractory metal oxide. The metal oxide support component is preferably one which is difficult to reduce, such an oxide of one or more metals of Groups III, IV, V, VI, and VII.

Typical support components include one or more of alumina, silica, and amorphous and crystalline aluminosilicates, such as zeolites. Particularly preferred support components are the Group IVB metal oxides, especially those having a surface area of 100 $m^2/g$ or less and even 70 $m^2/g$ or less. These support components may, in turn, be supported on one or more support materials. Titania, and particularly the rutile form of titania, is a preferred support component, especially when the catalyst contains a cobalt catalytic component. Titania is a useful component, particularly when employing a slurry hydrocarbon synthesis process, in which higher molecular weight, primarily paraffinic liquid hydrocarbon products are desired.

In some cases in which the catalyst comprises catalytically effective amounts of Co, it will also comprise one or more components or compounds of members selected from the transition metal groups VIIa or VIII of the Periodic Table (as defined in F. A Cotton, G. Wilkinson Advanced Inorganic Chemistry, $4^{th}$ Ed., Wiley, N.Y., 1980) as a promoter. Group VIII Nobel metals are particularly suitable. Also, rhenium, ruthenium, platinum and palladium are especially preferred. A combination of Co and Ru or Co and Re is often preferred. Useful catalysts and their preparation are known and illustrative, but nonlimiting examples may be found, for example, in U.S. Pat. Nos. 4,086,262; 4,492,774; 4,568,663; 4,663,305; 4,542,122; 4,621,072 and 5,545,674 and are incorporated by reference herein.

As these techniques demonstrate, after its initial formation, the catalyst undergoes a high-temperature oxidation process. Before the catalyst will properly operate in a HCS environment, it must be "activated" by reducing the oxidized catalytic metals to their metallic state. However, once activated, the catalysts are usually highly pyrophoric. Therefore commercially, most catalysts are sold after their first high-temperature oxidation, but before activation. As used herein, these newly formed, oxidized but not yet reduced catalysts are referred to as "fresh" catalyst.

The HCS catalyst may be used in either a fixed bed, fluid bed or slurry hydrocarbon synthesis processes for forming hydrocarbons from a synthesis gas comprising a mixture of $H_2$ and CO. These processes are well known and documented in the literature. In all of these processes, the synthesis gas is contacted with a suitable Fischer-Tropsch type of hydrocarbon synthesis catalyst, at reaction conditions effective for the $H_2$ and CO in the gas to react and form hydrocarbons. Depending on the process, the catalyst and synthesis reaction variables, some of these hydrocarbons will be liquid, some solid (e.g., wax) and some gas at standard room temperature conditions of temperature and pressure of 25° C. and one atmosphere, particularly if a catalyst having a catalytic cobalt component is used. In a fluidized bed hydrocarbon synthesis process, all of the products are vapor or gas at the reaction conditions. In fixed bed and slurry processes, the reaction products will comprise hydrocarbons which are both liquid and vapor at the reaction conditions.

Slurry hydrocarbon synthesis processes are sometimes preferred, because of their superior heat transfer characteristics for the strongly exothermic synthesis reaction and because they are able to produce relatively high molecular weight, paraffinic hydrocarbons when using a cobalt catalyst. In a slurry hydrocarbon synthesis process, a synthesis gas comprising a mixture of $H_2$ and CO is bubbled up as a third phase through a slurry in a reactor which comprises a particulate Fischer-Tropsch type hydrocarbon synthesis catalyst dispersed and suspended in a slurry liquid comprising hydrocarbon products of the synthesis reaction which are liquid at the reaction conditions. The mole ratio of the hydrogen to the carbon monoxide in the synthesis gas may broadly range from about 0.5 to 4, but is more typically within the range of from about 0.7 to 2.75 and preferably from about 0.7 to 2.5.

The stoichiometric mole ratio for a Fischer-Tropsch hydrocarbon synthesis reaction is approx. 2.0, but it can be increased to obtain the amount of hydrogen desired from the synthesis gas for other than the hydrocarbon synthesis reaction. In a supported cobalt-catalyzed slurry hydrocarbon synthesis process, the mole ratio of the $H_2$ to CO is typically about 2.1/1. Reaction conditions effective for the various hydrocarbon synthesis processes will vary somewhat, depending on the type of process, catalyst composition and desired products. Typical conditions effective to form hydrocarbons comprising mostly $C_{5+}$ paraffins, (e.g., $C_{5+}-C_{200}$) and preferably $C_{10+}$ paraffins, in a slurry process employing a catalyst comprising a supported cobalt component include, for example, temperatures, pressures and gas hourly space velocities in the range of from about 150–320° C., 5.5–42.0 bar and 100–40,000 V/hr/V, expressed as standard volumes of the gaseous CO and $H_2$ mixture (0° C., 1 atm) per hour per volume of catalyst, respectively. These conditions nominally apply to the other processes as well.

Hydrocarbons produced by a hydrocarbon synthesis process according to the practice of the invention are typically upgraded to more valuable products, by subjecting all or a portion of the $C_{5+}$ hydrocarbons to fractionation and/or conversion. By conversion is meant one or more operations in which the molecular structure of at least a portion of the hydrocarbon is changed and includes both noncatalytic processing (e.g., steam cracking), and catalytic processing (e.g., catalytic cracking) in which a fraction is contacted with a suitable catalyst. If hydrogen is present as a reactant, such process steps are typically referred to as hydroconversion and include, for example, hydro-isomerization, hydrocracking, hydrodewaxing, hydrorefining and the more severe hydrorefining referred to as hydrotreating, all conducted at conditions well known in the literature for hydroconversion of hydrocarbon feeds, including hydrocarbon feeds rich in paraffins. Illustrative, but nonlimiting examples of more valuable products formed by conversion include one or more of a synthetic crude oil, liquid fuel, olefins, solvents, lubricating, industrial or medicinal oil, waxy hydrocarbons, nitrogen and oxygen containing compounds, and the like. Liquid fuel includes one or more of motor gasoline, diesel fuel, jet fuel, and kerosene, while lubricating oil includes, for example, automotive, jet, turbine and metal working oils. Industrial oil includes well drilling fluids, agricultural oils, heat transfer fluids and the like.

HCS catalysts deactivate over time at process conditions. Many short-term catalyst deactivation processes, believed to be caused by cobalt surface oxidation, coking, or exposure to some inhibitors and poisons, such as HCN, $NH_3$, or oxygenates may be reversed in a process known as rejuvenation. Rejuvenation is effected by contacting the deactivated catalyst with a reducing agent, preferably hydrogen. The activity of the HCS catalyst in the reactive slurry is intermittently or continuously rejuvenated by contacting the slurry with hydrogen or a hydrogen containing gas to form a catalyst rejuvenated slurry either in-situ in the HCS reactor or in an external rejuvenation vessel, as is disclosed, for example, in U.S. Pat. Nos. 5,260,239; 5,268,344, 5,288,673 and 5,283,216.

Long-term catalyst deactivation is not corrected by rejuvenation. Long-term deactivation may be corrected by a far more severe process known as regeneration. Currently, regeneration of HCS catalysts occurs outside of the HCS process. U.S. Pat. No. 4,670,414 teaches an ex situ regeneration scheme which requires at least two external regeneration vessels following carefully controlled temperature and pressure programs.

Likewise, EP 0 533 288 B1 teaches an ex situ regeneration scheme requiring at least four separate staged processes: the removal of the catalyst and process fluids from the process reactor, filtration or other necessary treatments to remove process reactants and products, reducing the catalyst in a hydrogen atmosphere, transferring the catalyst to a second vessel to expose it to a hydro-thermal or oxidative regeneration process, transfer the catalyst to a third vessel, a catalyst activation vessel (CAV), for high temperature reduction, re-introducing the re-activated, regenerated catalyst back into the process reactor, and finally, restarting the HCS process.

At a minimum, all current HCS catalyst regeneration processes require cessation of the HCS process removal of the catalyst to a separate regeneration vessel, transfer to a second separate reactivation (reduction) vessel before re-introduction to the HCS process. These configurations also require a means to safely transport the highly pyrophoric regenerated and reduced catalyst between the reduction vessel and the HCS reactor.

SUMMARY OF THE INVENTION

The present invention provides a means and a process for activation of regenerated HCS catalysts in an in situ HCS process. The HCS reactor of the process of the current invention applies some form of catalyst rejuvenation means, one non-limiting form of such is described in U.S. Pat. No. 5,268,344. Specifically the present invention relates to an on-going slurry HCS process utilizing a supported Cobalt bimetallic catalyst, which allows for continuous or semicontinuous removal of the catalyst to a regeneration vessel, which catalyst, once regenerated, is reactivated by directly re-introducing the regenerated catalyst in its oxidized form into the ongoing HCS process, thus requiring no separate "on site" catalyst activation vessel.

The invention provides for the continuous or semicontinuous, in situ regeneration of HCS catalysts. The method comprises periodic or continuous removal of catalyst from an operating HCS reactor to a regeneration vessel. In the regeneration vessel, the catalyst is then exposed to a regenerative environment such as a high temperature (300–500° C.) oxidative treatment. Finally, the catalyst is returned to the operating HCS reactor also containing catalyst rejuvenation means allowing reduction to occur at HCS process temperatures which completes the catalyst regeneration.

DETAILED DESCRIPTION

With respect to the hydrocarbon synthesis, fixed bed, fluid bed and slurry hydrocarbon synthesis (HCS) processes for forming hydrocarbons from a syngas comprising a mixture of $H_2$ and CO are well known and documented in the literature. In all of these processes the syngas is reacted in the presence of a suitable Fischer-Tropsch hydrocarbon synthesis catalyst, at reaction conditions effective to form hydrocarbons. Some of these hydrocarbons will be liquid, some solid (e.g., wax) and some gas at ambient temperature conditions and pressure (25° C. and one atmosphere), particularly if a catalyst having a catalytic cobalt component is used.

Slurry HCS processes are often preferred because of their superior heat and mass transfer characteristics for the strongly exothermic synthesis reaction and because they are able to produce relatively high molecular weight, paraffinic hydrocarbons when using a cobalt catalyst. In a slurry HCS process a syngas comprising a mixture of $H_2$ and CO is bubbled up as a third phase through a slurry in a reactor which comprises a particulate Fischer-Tropsch type hydrocarbon synthesis catalyst dispersed and suspended in a slurry liquid comprising hydrocarbon products of the synthesis reaction which are liquid at the reaction conditions.

In the cobalt-catalyzed slurry HCS process, the mole ratio of the hydrogen to the carbon monoxide may broadly range from about 0.5 to 4, but is more typically within the range of from about 0.7 to 2.75 and preferably from about 0.7 to 2.5. The stoichiometric mole ratio for a slurry Fischer- Tropsch HCS process is approximately 2.1/1, but in the practice of the present invention it may be increased to obtain the amount of hydrogen desired from the syngas for other than the HCS reaction.

Slurry HCS process conditions vary somewhat depending on the catalyst and desired products. Typical conditions effective to form hydrocarbons comprising mostly $C_{5+}$ paraffins, (e.g., $C_{5+}$–$C_{200}$) and preferably $C_{10+}$ paraffins, in a slurry HCS process employing a catalyst comprising a supported cobalt component include, for example, temperatures, pressures and hourly gas space velocities in the range of from about 150–320° C., 5.5–42.0 bar and 100–40,000 V/hr/V, expressed as standard volumes of the gaseous CO and $H_2$ mixture (0° C., 1 atm) per hour per volume of catalyst, respectively.

Figure 1:
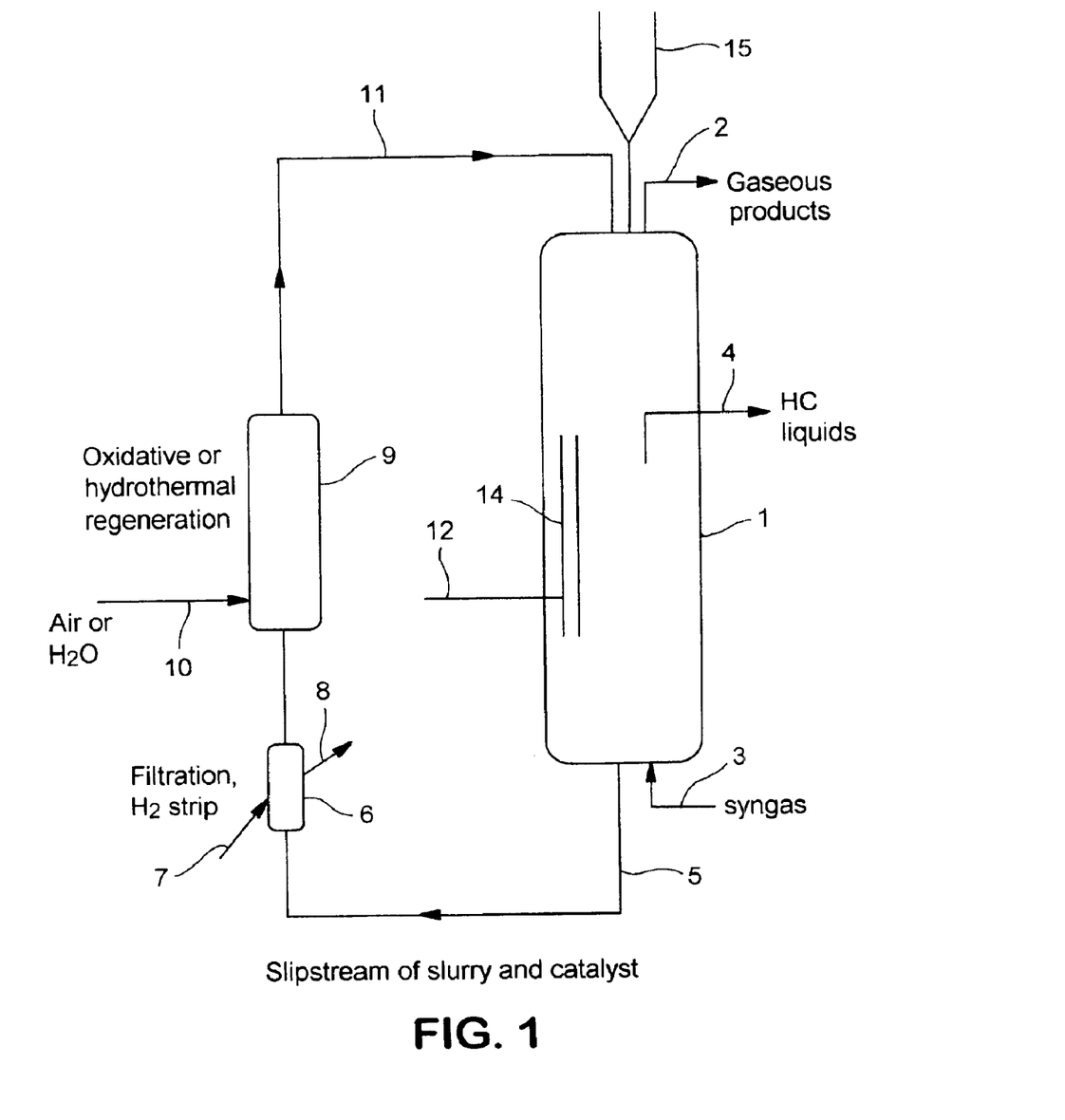
FIG. 1 schematically illustrates a schematic cross-section of the process vessels for the regeneration of spent catalyst or activation of pre-activated/passivated fresh catalyst.

FIG. 1 details one possible embodiment of the process for the in situ reactivation of a regenerated catalyst. Regenerated, but not yet re-activated, catalyst (15) may be introduced into an operating HCS reactor (1). Any combination of a fresh, activated catalyst, a pre-activated/passivated catalyst or a short-term or a long-term deactivated catalyst may already be present in the HCS reactor (1). The HCS reactor (1) receives syngas through the inlet line (3) and releases liquid hydrocarbons through the outlet line (4) and gaseous hydrocarbon and unreacted syngas through the offgas line (2). The HCS reactor (1) should employ at least one catalyst rejuvenation unit (14), which is fed with a catalyst rejuvenating fluid (12). Catalyst within the HCS reactor (1) may freely enter and exit the catalyst rejuvenation unit (14).

Catalyst is removed from the HCS reactor (1) through the slipstream line (5). This line feeds to filtration unit (6) which is fed with a stripping fluid (7) if necessary. Spent stripping fluid and stripped byproducts are removed from the filtration unit (6) through the filtration unit outlet line (8). The filtered catalyst proceeds to the regeneration unit (9) which is fed a regenerative fluid (10). The regenerated catalyst is returned to the HCS reactor (1) through the catalyst return line (11) wherein it is reactivated.

Many embodiments of the present invention are possible. The applicant provides numerous embodiments, none of which are meant to limit the invention in any way. In one embodiment, the filtration unit (6) is an $H_2$ stripping unit. The regeneration unit (9) employs oxidative treatments at above 300° C. In another embodiment, the slipstream line (5) and the catalyst return line (11) are the same line.

In another embodiment, the invention comprises the steps of:
1. removing a portion of a hydrocarbon synthesis catalyst from an operating HCS process which may contain catalyst rejuvenation means,
2. removing the reactants and products of the process from the catalyst,
3. exposing the catalyst to a regeneration environment, and
4. reintroducing the catalyst into the HCS process environment for catalyst reduction.

It is well known that standard catalyst rejuvenation techniques successfully reverse short-term deactivation mechanisms such as fouling, coking and carbon formation. Standard means of catalyst rejuvenation are accomplished by exposing the catalyst to any metal reducing substance; in the HCS process of the present invention it is preferably accomplished by exposing the catalyst to a full or partial $H_2$ stream in an area of lessened HCS process activity. Rejuvenation, however, does not reverse long-term deactivation mechanisms. One significant advantage of rejuvenation is that it may be employed in situ at reactor conditions, thus allowing for extended catalyst use in a continuous process environment.

Catalyst regeneration to reverse long-term deactivation requires conditions not found in a standard HCS catalytic process environment. Because of this, catalyst regeneration has not been successfully integrated into a continuous or semi-continuous in situ HCS catalytic process environment. The present invention's discovery of low temperature reduction following the catalytic regeneration process allows for continuous or semi-continuous catalytic process.

In the past, catalyst would be regenerated by removing the catalyst from the process reactor, transferring it to a first vessel for high temperature (300–500° C.) oxidation, then transferring it to a second vessel, a Catalyst Activation Vessel, for high temperature (~375° C.) reduction and finally returning the catalyst to the hydrocarbon synthesis process reactor. The object of the present invention is to simplify this process by eliminating the high temperature reduction step, thereby allowing a continuous or semi-continuous regeneration with catalyst reactivation (reduction) directly by the HCS fluids.

In another embodiment, the current invention relates to a Fischer-Tropsch process using a Co—Re/$TiO_2$ catalyst. Once activated, a spent catalyst may be oxidized and then be essentially fully reduced at the operating temperature of the Fischer-Tropsch slurry unit completing the catalyst regeneration. The catalyst need not be processed through a separate catalyst activation vessel to re-reduce it after oxidation. Instead, it may be re-reduced and fully activated in the slurry unit containing rejuvenation means. This allows for a continuous or semi-continuous process flow scheme where some of the catalyst is periodically or continuously removed from an operating HCS slurry reactor, treated in a regenerative environment and then directly returned to the operating slurry unit.

The process of the present invention is further described by way of the following illustrative examples which are not intended to limit the scope of the invention in any manner whatsoever.

EXAMPLE 1

"Fresh" Co—Re catalyst on a $TiO_2$ support was activated and placed in a Fischer-Tropsch reactor. Two samples were removed: an early-run sample, which was removed a few days after the reactor was in operation, and a late-run sample which was removed very late in the run cycle. Each sample was removed to a dry box and the wax extracted with hot toluene under inert conditions.

Each sample was divided into two portions. The first portion of each sample was directly transferred under inert condition into a chemisorption unit and the $H_2$ chemisorptions, a standard measure of catalytic activity, were measured by a dual isotherm technique. This technique is described by C. H. Bartholomew in "$H_2$ Adsorption on Supported Noble Metals and its Use in Determining Metal Dispersion", *Catalysis*, Vol. 11, pp. 93–126 (1994) CODEN: CATADK ISSN: 0140–0568, CAN 123:66509 AN 1995:536025 CAPLUS. The second portion of each sample was regenerated in a high temperature (350° C.) oxidative (air) environment, and then reduced in the presence of $H_2$ at 225° C. The second portion of each sample was then transferred under inert condition into a chemisorption unit and the $H_2$ chemisorptions were measured by a dual isotherm technique. Table 1 illustrates the chemisorption results.

TABLE 1

% Strong H Chemisorption values (H/Co) after reduction at 225° C. Combined and back sorption isotherms measured at 40° C.

| Sample | After Wax Extraction | After regeneration with air at 350° C. |
|---|---|---|
| Early-run-inertly wax extracted | 3.75 | 4.47 |
| Late-run-inertly wax extracted | 1.61 | 4.12 |

The first column of Table 1 shows far higher H chemisorption values for the non-regenerated early-run catalyst as compared to non-regenerated late-run catalyst. This indicates that the early-run catalyst was rejuvenated under reduction conditions present in the 225° C. H chemisorption. But, as expected, the late-run catalyst was not rejuvenated due to long-term deactivation mechanisms that are not reversed by hydrogen treatment. Fresh catalyst, measured after a 375° C. $H_2$ reduction and a 150° C. air oxidation have a H chemisorption value of approximately 3.7 to 4.1.

As the second column of Table 1 demonstrates, late-run catalyst activity increased significantly after regeneration by high temperature oxidation followed by low temperature reduction demonstrating that the current invention's regeneration/in situ (low, HCS temperature) reactivation process successfully reversed the majority of long-term deactivation effects. The oxidative regeneration followed by a low temperature $H_2$ treatment restores almost all (within 10%) of the catalytically active sites as are present in the fresh catalyst. Also as expected, the early-run catalyst showed small H chemisorption increases after high temperature oxidative regeneration as the majority of activity loss was due to short-term deactivation effects.

EXAMPLE 2

Figure 2:
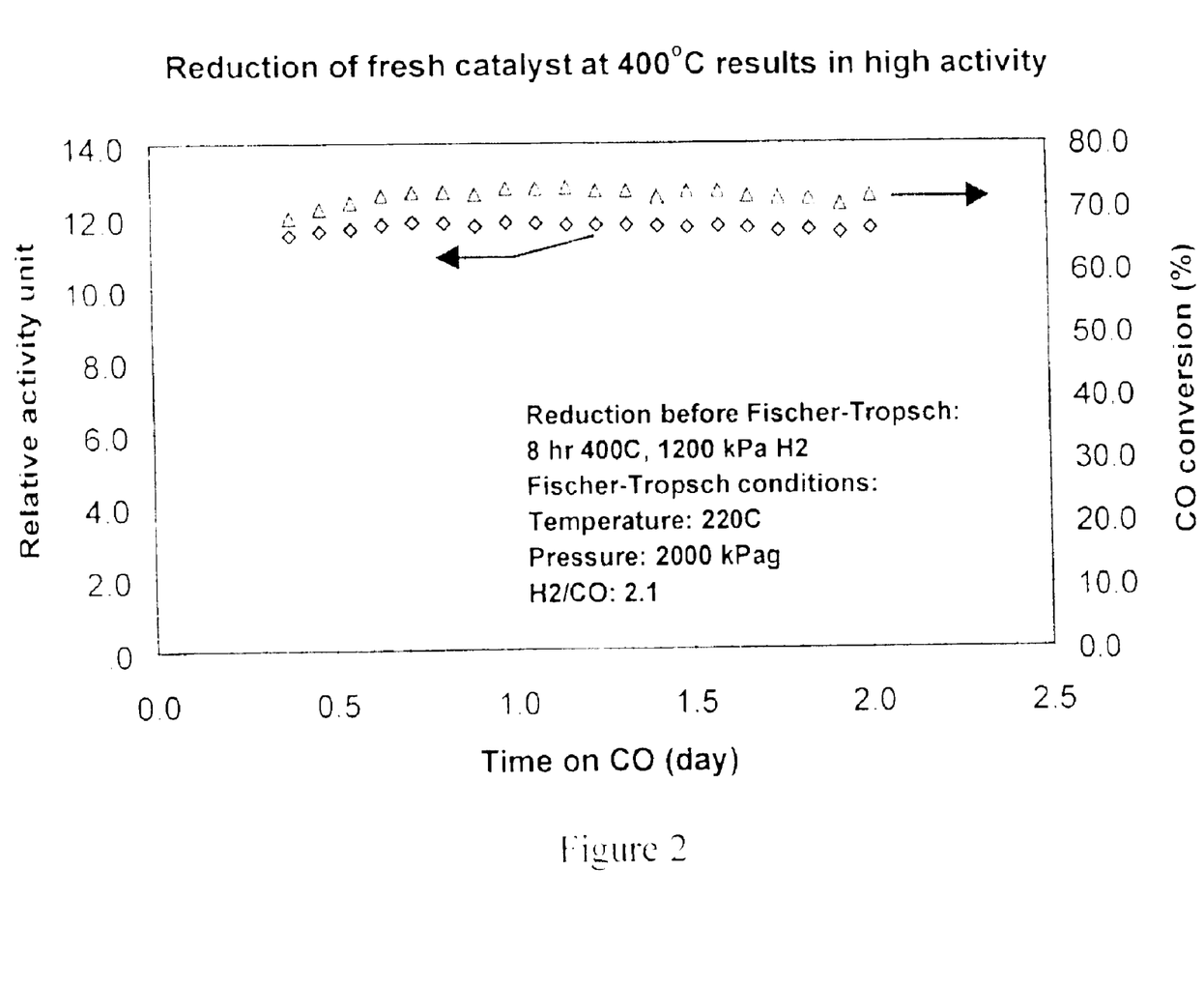
FIG. 2 demonstrates the late-run relative activity of a "fresh" catalyst activated in a high-temperature reduction.

A "fresh" (non-activated) catalyst was reduced (activated) in a hydrogen atmosphere at high temperature conditions (1200 kPa, 400° C. for 8 hours). The catalyst was then placed in a Fischer-Tropsch synthesis reactor operated at 200° C., 20.25 bar with a 2.1 $H_2$/CO ratio. The activity of the catalyst was determined by measuring the catalyst productivity (moles of CO converted/volume of catalyst), adjusted for differences in reaction conditions using a kinetic model similar to those found in W. D. Deckwer, "Kinetic Studies of Fischer-Tropsch Synthesis on Suspended Fe/K Catalyst—Rate Inhibition by $CO_2$ and $H_2O$.", *Ind. Eng. Chem. Process Dev.*, Vol 25, pp. 643–649 (1986). Relative activity levels for this catalyst are reported in FIG. 2. The activity level for this "fresh", high-temperature reduced catalyst averaged slightly less than 12.0 as expected.

EXAMPLE 3

Figure 3:
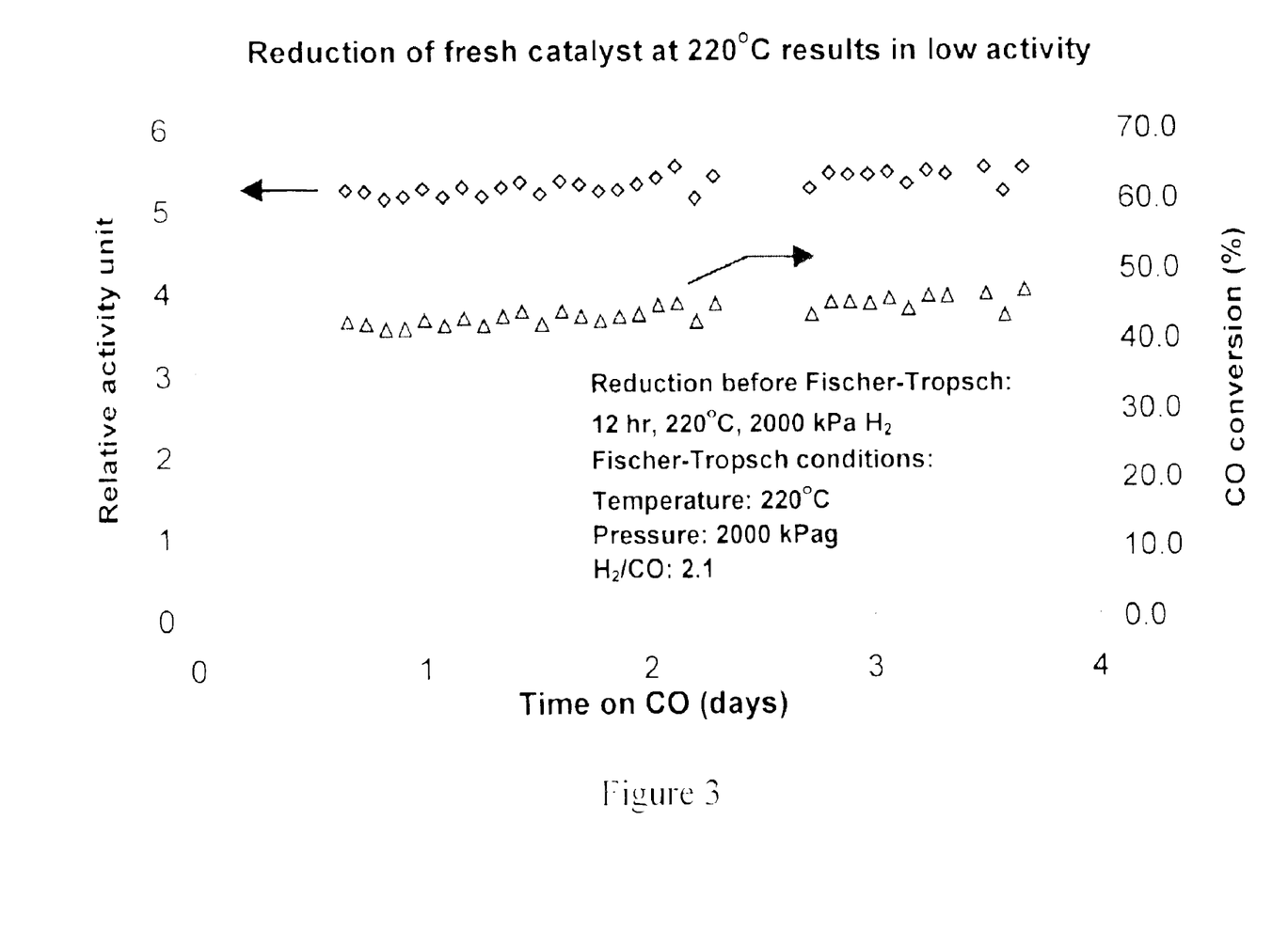
FIG. 3 demonstrates the relative catalytic activity of a fresh late-run catalyst reduced in a low-temperature environment.

The same experiment as in Example 2 was conducted except that the initial hydrogen reduction of the "fresh" catalyst was conducted at low-temperature rejuvenation conditions (220° C., 2000 kPa for 12 hours). As in example two, the catalyst was placed in a Fischer-Tropsch reactor (at the same operating conditions) and the relative activity was measured. The relative activities for this catalyst are reported in FIG. 3. The relative activity for this catalyst ranged between 5.0 and 5.5. These results clearly demonstrate that a low-temperature reduction of a "fresh" catalyst did not activate the catalyst to acceptable HCS activity levels.

EXAMPLE 4

A sample of catalyst prepared in the same manner as that in example 2 was inertly extracted from an operating Fischer-Tropsch reactor early in the reactor's run. This sample was loaded into a fixed bed reactor operating at the same Fischer-Tropsch conditions as in example 2. After approximately four days, the catalyst was stripped of wax under a $H_2$ flow, and then oxidized with a 1% $O_2$ in nitrogen gas mixture at 20 atmospheres. Following this regeneration procedure, the catalyst was reduced at 200° C. for 12 hours at 20.25 bar of $H_2$ pressure, the Fischer-Tropsch reaction continued. After Approximately 5.5 days, a similar wax stripping treatment was performed, the catalyst was regenerated in the same manner, but was re-reduced at 400° C. for 8 hours under 12 atmospheres of $H_2$ pressure. The relative activity values are shown in FIG. 4.

Figure 4:
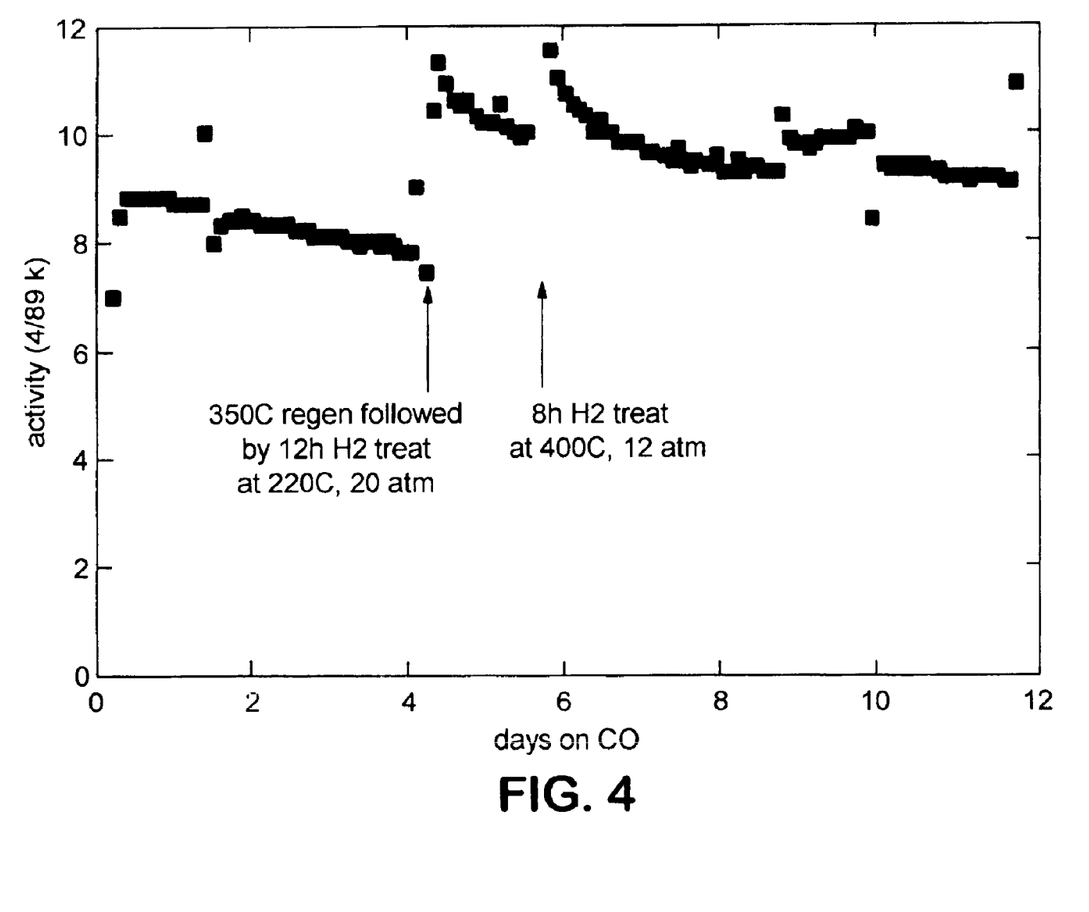
FIG. 4 demonstrates the effect on catalyst activity of subsequent low-temperature reductions after a "fresh" catalyst has undergone one high-temperature reduction.

FIG. 4 shows that the activity starts at a relative activity unit of approximately 9 and, as expected, slowly decreases with time. After a regeneration at 350° C. and a reduction at 220° C. the activity increases again to approximately 10. A comparison between the effectiveness of the later regeneration process using low temperature re-reduction and high temperature re-reduction (at 400° C.) demonstrates that the activity does not change relative to the reduction temperature once the catalyst is reduced and oxidized at least once.

This demonstrates that following a catalyst's first high-temperature reduction, any subsequent reduction may be a low temperature reduction and still restore the catalyst to full activity. This invention eliminates the need for transferring the catalyst to a separate reduction vessel for activation after regeneration. Further, this invention allows for a continuous, in situ regeneration/re-activation process, eliminating the previous requirement to interrupt the HCS process.

What is claimed is:

1. A process for activating a regenerated, but not re-activated, catalyst comprising:
   introducing said regenerated, but reactivated catalyst into a slurry HCS reactor operating at HCS slurry process conditions and containing catalyst rejuvenation means whereby said catalyst is activated.

2. The process as in claim 1 wherein the HCS reactor operates in the range of 150–320° C.

3. The process as in claim 1 wherein the HCS reactor operates in the range of 5.5–42.0 bar.

4. The process as in claim 1 wherein the HCS reactor hourly gas space velocities for syngas operates in the range of 100–40,000 V/hr/V.

5. The process as in claim 1 wherein the cobalt catalyst is a bimetallic catalyst comprising Co and one member selected from the group of Re and Ru.

6. A process according to claim 1 wherein said regenerated, but not re-activated catalyst is obtained by:
   removing a portion of said catalyst from said operating HCS reactor to a regeneration vessel;
   subjecting the removed catalyst to a regeneration environment to form said regenerated catalyst.

7. The process as in claim 6 wherein the said catalyst is removed on a continuous or semi-continuous basis.

8. The process as in claim 7 wherein said regeneration environment is an oxidating environment.

9. The process as in claim 7 wherein said oxidative environment operates at greater than 300° C.

10. The process of claim 9 wherein the cobalt catalyst is a Co-Re/$TiO_2$ catalyst.

11. The process as in claim 7 wherein the cobalt catalyst is a bimetallic catalyst comprising Co and one member selected from the group of Re and Ru.

12. The process as in claim 7 wherein said removed catalyst is filtered to remove at least a portion of reactants and products prior to subjecting the removed catalyst to said regenerative environment.

13. The process of claim 7 wherein said removed catalyst is subjected to $H_2$ stripping prior to subjecting the removed catalyst to said regeneration environment.

14. A hydrocarbon synthesis process comprising:

providing an HCS slurry reactor containing catalyst rejuvenation means;

containing, or having introduced into said HCS reactor, at least one cobalt catalyst from the group of a fresh, passivated catalyst, a fresh, activated catalyst, a short-term deactivated catalyst or a long term deactivated catalyst;

contacting said catalyst with $H_2$ and CO at a mole ratio between 0.5 to 4.0, a temperature range of 150–320° C., a pressure range of 5.5–42.0 bar and an hourly gas space velocity of 100–40,000 V/hr/V at standard volumes;

periodic or continuous removal of said catalyst to a regeneration vessel producing regenerated, but not re-activated, catalyst; and returning said regenerated, but not re-activated, catalyst to said HCS reactor whereby said regenerated, but not re-activated, catalyst is re-activated at HCS operating conditions.

15. The process as in claim 14 wherein the cobalt catalyst comprises Co and one member selected from the group of Re and Ru.

16. The process of claim 15 wherein the cobalt catalyst is a Co-Re/$TiO_2$ catalyst.

* * * * *

UNITED STATES PATENT AND TRADEMARK OFFICE
CERTIFICATE OF CORRECTION

PATENT NO. : 6,900,151 B2
DATED : May 31, 2005
INVENTOR(S) : Stuart Leon Soled et al.

It is certified that error appears in the above-identified patent and that said Letters Patent is hereby corrected as shown below:

Column 8,
Line 37, the word -- not -- should be inserted between the words "but" and "reactivated".

Thus, claim 1 should read as follows:

1. A process for activating a regenerated, but not reactivated, catalyst comprising:

introducing said regenerated but not reactivated catalyst into a slurry HCS reactor operating at HCS slurry conditions and containing catalyst rejuvenation means whereby said catalyst is activated.

Signed and Sealed this

Twenty-seventh Day of September, 2005

JON W. DUDAS
*Director of the United States Patent and Trademark Office*